United States Patent [19]

Lindbauer et al.

[11] Patent Number: 4,767,605
[45] Date of Patent: Aug. 30, 1988

[54] METHOD FOR SEPARATION OF ACID POLLUTION GAS

[75] Inventors: Ralf Lindbauer; Alfred Glasner, both of Graz, Austria

[73] Assignee: Waagner-Biro Aktiengesellschaft, Austria

[21] Appl. No.: 803,587

[22] Filed: Dec. 2, 1985

[30] Foreign Application Priority Data

Nov. 30, 1984 [AT] Austria .................................. 3800/84
Jan. 29, 1985 [AT] Austria .................................. 233/85

[51] Int. Cl.$^4$ .......................... B01J 8/00; C01B 17/00; C01B 7/00; C01P 7/00
[52] U.S. Cl. ..................................... 423/239; 423/235; 423/240; 423/244; 423/420; 423/424
[58] Field of Search ........... 423/242 R, 242 A, 244 R, 423/244 A, 239, 239 A, 235, 235 D, 240 R, 240 S, 420, 422, 424

[56] References Cited

U.S. PATENT DOCUMENTS

| 3,826,816 | 7/1974 | McCormick | 423/240 |
| 3,846,535 | 11/1974 | Fonseca | 423/242 |
| 3,852,410 | 12/1974 | Rivers et al. | 423/244 |
| 3,880,618 | 4/1975 | McCrea et al. | 423/239 |
| 4,080,428 | 3/1978 | Holter et al. | 423/243 |
| 4,481,172 | 11/1984 | Lowell et al. | 423/242 |

FOREIGN PATENT DOCUMENTS 56-105731  8/1981  Japan .................................. 423/244

OTHER PUBLICATIONS

Karlsson et al., Activated Wet-Dry Scrubbing of SO$_2$ Journal of Air-Pollution Control Ass., Jan. 1983, vol. 33, No. 1 pp. 23–28.

Primary Examiner—Gregory A. Heller
Attorney, Agent, or Firm—Steinberg & Raskin

[57] ABSTRACT

Method and apparatus for separating at least one harmful substance such as SO$_2$, HCl or NO$_x$ where x is 1 or 2, from combustion exhaust gases containing the same. The exhaust gases are contacted with at least one particulate adsorbent which, at a release temperature below 400° C., releases at least one of water, ammonia, or carbon dioxide, for reaction with the harmful substances. This reactant leaves the adsorbent in activated condition. Thus, the reactant and activated adsorbent serve to remove harmful substances from the flowing exhaust gas.

30 Claims, 1 Drawing Sheet

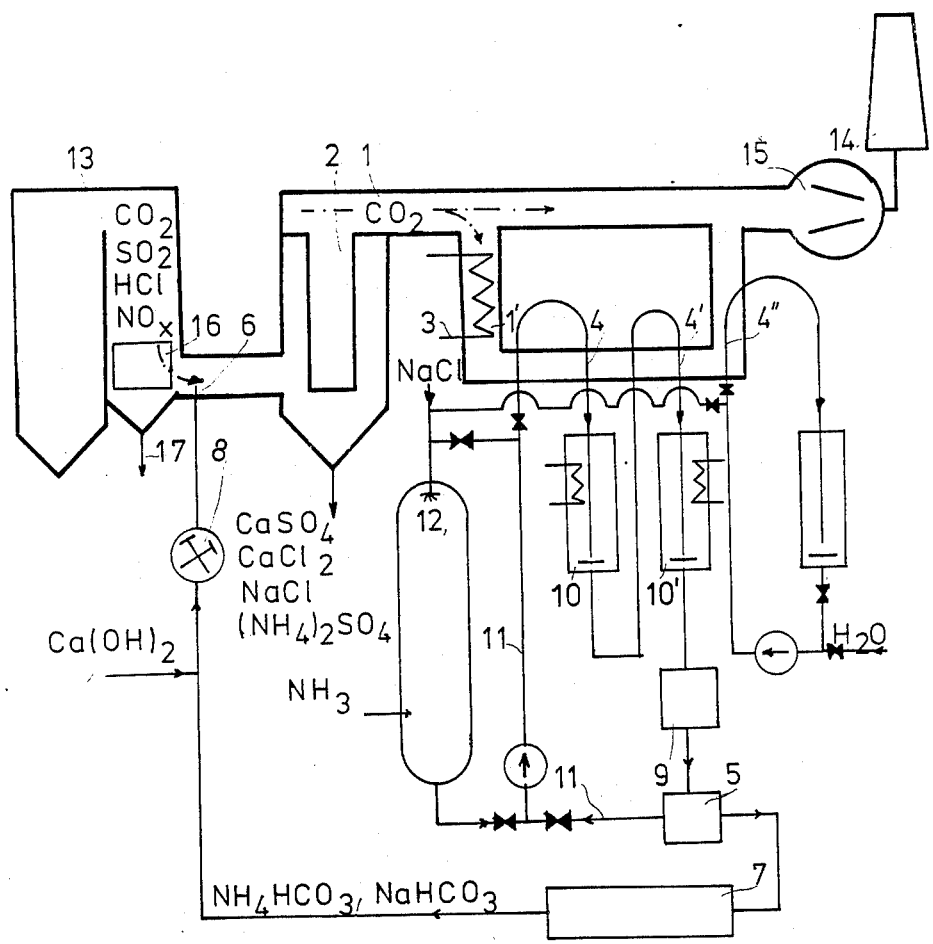

METHOD FOR SEPARATION OF ACID POLLUTION GAS

BACKGROUND OF THE INVENTION

The present invention is directed to a method for separating harmful substances, such as $SO_2$, HCl and $NO_x$ where x is 1 or 2, for example, from combustion exhaust gases, by way of dry adsorbents based upon hydrated oxides, hydroxides, or oxides. Such dry adsorbents include $Ca(OH)_2$, AlOOH, $Al(OH)_3$, $Al_2O_3xH_2O$, bauxite, CaO, NaOH, and/or carbonates, and/or hydrogen carbonates. The exhaust gases so treated, have high combustion chamber temperatures, such as attained by bituminous coal firing, for example.

In the present invention, the powdered or particulate adsorbents, are blown into at least a portion of the flowing exhaust gas at an exhaust gas temperature below about 400° C., thereby binding any chlorides which may be present in the exhaust gas. The exhaust gases or fumes are subsequently released into the open environment through a chimney, after precipitation of the solid components therefrom. The present invention also relates to an apparatus for carrying out this procedure.

DE-OS No. 31 39 080 discloses the blowing or injection of $Ca(OH)_2$ adsorbent into a waste or refuse boiler at a flue gas temperature of 400° to 350° C. in order to separate the chlorine and/or fluorine from the flue gases of a waste or refuse incinerator, and to bind these harmful substances. The exhaust gases are then cleaned and transmitted into the atmosphere. The disadvantage of this procedure and apparatus, is that the exhaust gases containing the dust and adsorbents, are directed through the final heating surfaces, so that the gases quickly pollute the environment. The combined separation of dust and chlorides or fluorides leads to an intimate mixture of these three components, thus making separation and further treatment practically impossible. Simultaneous adsorption of $SO_2$ and/or reduction of $NO_x$ or sulphate formation, is not indicated.

It is known that adsorption is more efficient in a "wet" manner than in a "dry" condition for the separation of $SO_2$-containing harmful fumes from the exhaust gases. It is also known that in the case of the "dry" separation of the harmful fumes, at similar surface boundary conditions, but with different exhaust gases, the degree of separation is subject to large fluctuations, whereby refuse firing generally produces a better degree of separation than coal firing.

SUMMARY OF THE INVENTION

Accordingly, it is an object of the present invention to improve separation of harmful substances from combustion exhaust gases.

It is a more particular object of the present invention to improve removal of $SO_2$, and HCl from the exhaust gas, and to improve removal or conversion of $NO_x$ in the exhaust gas.

It is another object of the present invention to improve the "wet" separation of harmful substances from the flowing exhaust gas.

It is a further object of the present invention to provide for synthesis or regeneration of adsorbent for removing harmful substances from the flowing exhaust gas.

It is also another object of the present invention to improve stoichiometric ratios in reaction of adsorbent with flowing exhaust gas, to remove the harmful substances from the same.

These and other objects are attained by the present invention in which harmful substances, such as $SO_2$, HCl, and $NO_x$ where x is 1 or 2, are removed from combustion exhaust gases containing the same. The exhaust gas is contacted with at least one particulate adsorbent which, at a release temperature below 400° C., releases at least one reactant for the harmful substances. The reactant, which leaves the adsorbent in activated condition substantially free of the reactant itself, is selected from the group consisting of water, ammonia, and carbon dioxide. Thus, the reactant and the activated adsorbent act to remove harmful substances from the flowing exhaust gas.

Physically, and/or chemically-conditioned release of fission and/or reaction products, is attained by the present invention during the addition of the adsorbent into the partially cooled-off exhaust gas flow. Therefore, the molecules of the harmful gas component will encounter wet conditions at the well-dispersed adsorbent molecules in the exhaust gas, so that a gas-liquid reaction is executed instead of just a gas-solid reaction. The essential "in situ" water accumulation at the adsorbent particles, always provides sufficient available water for the gas/liquid reaction at the adsorbent grains (granules), in spite of water accumulation at the sulfate molecule. Thus the stoichiometric ratios of adsorbent to harmful substances can be greatly improved and simplified over the stoichiometrics in previouslyutilized installations and processes, such prior stoichiometrics being three times greater than those attained by the present invention.

At least a portion of the dust produced in the combustion chamber is removed prior to the blowing-in or addition of the adsorbents into the flowing exhaust gas to be purified. Also, at least a portion of the adsorbents is split off into molecular size, as a result of the influence of temperature, to generate $H_2O$ and/or $NH_3$ and/or $CO_2$, thus activating the added-adsorbent. The adsorbent may include one or more of the following compounds, for an example: $NaHCO_3$, $NH_4HCO_3$, $Al(OH)_3$, silica gel, $Ca(OH)_2$, salts with water of crystallization such as $CaCl_2$ or $Al_2O_3$.

By the activation of these added adsorbents, $SO_2$ is not only bound (through formation of a sulfite or sulfate), but nitric oxides are also bound or transformed to nitrogen. This latter step is attained by a change of the crystal structure of the particularly-active adsorbent, which takes place in "status nascendi".

The present invention is also directed to an apparatus for carrying out the above-noted procedure, where an inlet for an adsorption agent or a mixture of adsorption agents is provided in the flowing exhaust gas after a combustion installation or chamber. This inlet is especially provided in front of a final heat recovery surface, and after or downstream of the last tubular heating surface in the combustion chamber. Moreover, a dry filter device, especially a cloth filter, and a suction draft blower are provided in the path of the flowing exhaust gas.

It has been surprisingly found that the transformation of $NO_x$ harmful gaseous substances, to harmless component parts, is greatly improved by the present invention.

Formation of fission and/or reaction products (reactant) from adsorbents, occurs, for example, according to the following equations:

(1) Reaction water: $CaO + 2 HCl = CaCl_2 + \underline{H_2O}$ (2) Molecular water: 2NaHCO$_3$ decomposes at temperatures above 100° C. to Na$_2$CO$_3$+H$_2$O+CO$_2$, or NH$_4$HCO$_3$ splits at temperatures of 35° C. into NH$_3$+H$_2$O+CO$_2$ or Al(OH)$_3$ splits into AlOOH+H$_2$O.

(3) Water of crystallization: CaCl$_2$. 6H$_2$O splits off 4H$_2$O at temperatures above 30° C. and also splits off the remaining (2H$_2$O) water of crystallization particularly at temperatures greater than 200° C. FeCl$_3$ and Al$_2$O$_3$ react in a similar manner.

(4) Adsorbed water: Water from the atmosphere (capillary condensation) may condense in molecular size in the pores of dry dust particles (salts), whereby these water molecules can evaporate only at high temperatures, often above 500° C.

Furthermore, during the re-forming of NO$_x$, it is important for NH$_3$ to be available in small (molecular) size in sufficient quantity, in order to disintegrate or reduce the NO$_x$ or to bind NO$_x$ into nitrates. For this purpose, it is possible to use ammonium compounds, such as NH$_4$Cl which breaks down into NH$_3$ and HCl at 300° C., as well as utilizing NH$_4$HCO$_3$ which already breaks down at approximately 60° C. into NH$_3$+H$_2$O+CO$_2$.

Operation of simultaneous desulfurization and denitrogenization, is described as follows: It has been known that Na$_2$CO$_3$ (soda) binds sulfur barely effectively. However the addition of NaHCO$_3$, for instance in the form of baking soda or as a mineral (nahcolite), binds sulfur to a considerably greater extent, when the addition takes place at temperatures above the release or evolution of H$_2$O and CO$_2$ (i.e. above 60° C.). H$_2$O and CO$_2$ escape from the crystal, with Na$_2$CO$_3$ remaining, present in an especially active form, because it appears in "status nascendi" and thus still possesses the lattice structure of the baking soda, while it is chemically present as Na$_2$CO$_3$ (soda).

At the same time, water is present in the pores which are formed during the release from the crystal, thus promoting the binding-in of SO$_2$. The active crystal, Na$_2$CO$_3$, on the other hand, is active for the reason that the lattice defects release unsaturated electrons, which in turn, effect the binding-in or transformation of NO into N$_2$ and/or NO$_2$. The Na$_2$CO$_3$ is also active because the specific surface of the freshly-formed or transforming crystals is very large.

It is essential that unstable compounds are created, at least partially, which reduce NO$_x$ to N$_2$, so that N$_2$ can be formed which can no longer be changed back into NO$_x$ due to the low temperature level. Remaining NO$_2$ is transformed into N$_2$ by the NH$_3$ made available at the same time (either as NH$_3$ or as NH$_4$OH, or as a result of disintegration of an NH$_3$-containing salt). 3.5N$_2$+6H$_2$O is ultimately formed from 3NO$_2$+4NH$_3$.

The following criteria apply for the selection of the active substances for the mixing of the adsorbents, for attaining the simultaneous desulfurization and denitrogenization. Within the individual groups of adsorbents, selection takes place according to availability or economic consideration, and/or further treatment of the adsorbents that is conducted. For desulfurization, compounds should be used which split off H$_2$O creating surfaces for the binding of sulfite or subsequent sulfate, thus creating more favorable initial conditions for the otherwise extremely inert or inactive reaction gas/solids (SO$_2$ or alkaline substances) which then react in the presence of water. In other words, suitable compounds include, for example, NaOH (in solid or liquid form), NaHCO$_3$, NH$_4$HCO$_3$, Ca(OH)$_2$, Al(OH)$_3$, AlO(OH), compounds which give off water of crystallization, calcium oxide which reacts as follows: CaO+2HCl to give off reaction water, NaHSO$_3$, BOH, or solid or liquid organic compounds, such as organic acids including formic acid or acetic acid.

For the denitrogenization, the adsorbent should include a compound which additionally or simultaneously results in a sudden crystal lattice transformation, whereby the newly created compound (by way of heat, or by way of mechanical force such as pulverizing or grinding, for example) is especially active in "status nascendi" (i.e. by "bursting" transformation into a new compound), and possesses unsaturated surface valences which can be used for transformation of NO to N$_2$ and/or NO$_2$. This occurs, for example, through the addition of NaHCO$_3$ (transformation to Na$_2$CO$_3$), forming an especially active Na$_2$CO$_3$* in "status nascendi".

NO$_2$ which has not been simultaneously transformed into N$_2$ (from the former NO), must now be transformed into N$_2$. This is accomplished by adding, at the same time or later, NH$_3$ or NH$_3$-containing compounds or solutions which release NH$_3$ when heat is introduced (possibly also releasing NH$_3$*).

Within the scope of the present invention, it is possible to increase the degree of dry adsorption, as far as effectiveness is concerned. This is of special importance in the case of high temperatures in the combustion chamber, occurring, for example, if bituminous coal is used for firing, where the addition of lime into the combustion chamber is only of little effect. Since chemical industrial processes and installations must first be adjusted to requirements of exhaust gas purification (e.g. inexpensive adsorbents of not too great a purity, but availability in large amounts), it is very important that a manufacturer of furnaces can easily produce the adsorbent by oneself, thus requiring only chemically raw material NH$_3$ which is available in great quantities, and the purchase of which does not constitute too great an expense. This attainment is explicitly possible with the present invention.

For the separation of sulfur dioxide (SO$_2$), especially in the absence of any HCl in the exhaust gas, an additive has to be blown into the flowing exhaust gas stream together or in admixture with the adsorbent itself. In particular, this additive may be HCl in solid or in liquid form. More especifically, the adsorbent may be introduced into the flowing exhaust gas in admixture with from 0.5–50%, more preferably from 2 to 10%, of a halide especially chlorides such as NaCl, ammonium-containing compounds or alkaline compounds, such as NH$_4$Cl, (NH$_4$)$_2$CO$_3$, or Ca(OH)$_2$ with decomposition or sublimation temperatures less than or equal to about 400° C.

Powdered, "over-quenched" Ca(OH)$_2$, as an adsorption agent, is preferably blown into the exhaust gas flow in a hydration step, especially in admixture with CaCl$_2$ and/or FeCl$_3$ with water of crystallization, whereby chlorides are produced through treatment with HCl of the Ca(OH)$_2$ and its impurities. For the separation of SO$_2$ in the absence of HCl, especially for the additional separation of NO$_x$, the following adsorbent may be blown into the flowing exhaust gas current: Ca(OH)$_2$ and/or hydrogen carbonate such as NaHCO$_3$ and/or NH$_4$HCO$_3$, NH$_4$OH, NH$_3$, or NH$_3$-containing compounds, for example. In particular, the required ammonium-based and/or soda-based adsorbent is produced from the purified gas flow after or downstream of a dry-separator, by introducing ammonia in aqueous solution under the release of heat.

BRIEF DESCRIPTION OF THE DRAWING

The accompanying drawing is a schematic illustration of an embodiment of the present invention. This figure illustrates the interconnection, i.e. a circuit arrangement of a thermo power installation equipped with exhaust gas purification and adsorption agent production installations.

DESCRIPTION OF THE PREFERRED EMBODIMENTS

Referring to the drawing, cooled flue gas current 1 flows from a combustion chamber 13, at approximately 200° C. through a cloth filter 2, in which powdered impurities are precipitated through a chimney 14, into the open. At the outlet of the combustion installation or chamber 13, the exhaust gas is precipitated in a dry-separator such as an electric filter 16. A dry adsorbent, such as $Ca(OH)_2$ is added to the thus-purified flue gas which has now been cooled to below 400° C., in an adsorption phase. The added adsorbent, adsorbs the harmful gases such as $SO_2$ and/or HCl, whereby the loaded adsorbent is then separated in a cloth filter 2.

A difficulty is encountered at this point, in that the adsorbent reacts only on the surface thereof with the $SO_2$, if the chloride content in the flowing exhaust gas is low, so that only a very minor binding of $SO_2$ can take place, and then only with high stoichiometrics of 2 to 3. However, this disadvantage can be eliminated by adding, to the adsorbent, chlorides such as $CaCl_2$ and/or $FeCl_3$ in an amount of e.g. 2 to 5%, so that the $Ca(OH)_2$ is intermixed with chlorides. This admixture is especially effective if the two adsorbents have been produced together from the start (e.g. by slaking of the burned lime under the addition of hydrochloric acid).

The important advantage of utilizing the $CaCl_2$ is that this salt is able to contain a relatively large amount of water of crystallization, and is able to release all of this water of crystallization at temperatures exceeding 200° C. As a result, these water particles are formed in molecular size in "status nascendi", during the formation of sulfate.

This moistness, which bursts forth along not only the surface of the dust particles but also in the interior thereof, precipitates an extremely effective gas/liquid reaction instead of a customary gas/solid reaction, which would otherwise occur in a relatively slow and insufficient manner. In this connection, it is extremely important that the liquid originates practically on the grains and is not conveyed in by water vapor content of the flowing exhaust gas. This latter step had been tried with "wet" processes up to now, such as washing spray procedures. Such previously-used steps included falling below the dew point of the flowing exhaust gas, and/or injecting water in front of a filter such as a cloth filter, along with other types of attempts. These steps only produced the unfavorable result that the cloth filters, in particular, were subject to an uneconomically high loss of pressure, since the water outside the dust particles cause the dust particles to become glued together. In contrast, the water at the so-called "inner" surface of the dust particles, i.e. within the adsorbent, does not suffer from this disadvantage.

The $NO_x$ cannot be disintegrated in large quantities through the addition of $Ca(OH)_2$ and $CaCl_2$. In order to get this harmful gas under control, the present invention provides that, together with the $Ca(OH)_2$ which may also contain $CaCl_2$, hartshorn salt, primarily $NH_4HCO_3$, and/or baking soda ($NaHCO_3$), and/or similar compounds, are admixed with the $Ca(OH)_2$. Alternatively, the aforementioned hydrocarbonates, which are not stable and disintegrate into component parts at temperatures from 30° C. to 400° C., may be entirely substituted for the $Ca(OH)_2$ adsorbent.

To the extent that the component parts of the disintegrated hydrogen carbonates have a tremendous reaction tendency, it is possible to disintegrate (reduce) the harmful gases in good stoichiometric ratios with high effectiveness. Hartshorn salt and baking soda are relatively expensive adsorbents. However, these adsorbents can be produced or recovered from the $CO_2$ of the flowing flue gas, with water, $NH_3$ (and optionally with sodium chloride), in an installation which is connected thereto.

For this purpose, approximately 5% of the flue gas is diverted from the flue gas current 1 and guided through a flue gas cooler 3. This partial current 1' is now conveyed to one or several solution reactors 10, 10', where it is brought into contact with water or with an $NH_3$-saturated liquid, with the $CO_2$ of the cleansed flue gas being partially dissolved. Flue gas removal points 4, 4' and 4'' are provided in the partial current 1' of the exhaust gas, for this purpose.

The newly produced solution of the three aforementioned components ($NH_3$, NaCl, and $CO_2$) is then cooled in the solution reactor 10', as well as in a cooler 9 which is connected thereto at the outlet side, so that hartshorn salt or baking soda precipitates. The precipitating crystals are thrown out within a centrifuge 5, and then conveyed through a dryer 7, and through a crystal-crushing device 8 such as a mill, to a distributing device 6 for introducing the adsorbents into the flowing flue gas.

The mother liquor, which is crystal poor, is conveyed through a recirculation line 11 to an $NH_3$-saturator 12, and/or is mixed with mother liquor that has been saturated with $NH_3$. This $NH_3$-saturated solution is then conveyed to the flue gas removal point 4, so that this solution again comes into contact with the $CO_2$ of a partial current 1' to generate new adsorbent crystals.

The partial current 1' of the flue gas is again mixed into the hot flue-gas current 1 at approximately 220° C., after the required amounts of $CO_2$ have been removed. This combined stream is then released into the chimney 14 through a blower 15 as illustrated. As illustrated in the FIGURE, NaCl may be added to the aqueous solution of ammonia, e.g. in the saturator 12, for production of a soda-based adsorbent.

In order to obtain a pure-loaded adsorbent, it is preferable to dry-clean the flue gases ahead of the distributing device 6 for introducing the adsorbent into the flowing flue gas stream 1. The exhaust gases are preferably cleaned in an electro-filter 16, with ash particles being removed in the direction of arrow 17 in the drawing, so that as few ash particles as possible from the combustion installation 13 reach the cloth filter 2. Thus, this filter 2 requires much less frequent cleaning, while pressure loss is maintained within narrow limits.

Additional reasons for this initial removal of ash in the direction of arrow 17, in addition to other features of the present invention, are as follows. The product obtained during the adsorption phase through reaction of the adsorbent with the harmful gases, can be sold or re-used directly in the plant. However, due to high dust contents of the flowing exhaust gas, the value of this product is decreased, or it becomes completely unuseable. However, one obtains ammonium sulfate or ammonium bisulfate during the reaction of $SO_2$ with hartshorn salt, the ammonium sulfate/bisulfate being relatively pure, and being capable of being used as fertilizers.

It may be advisable to carry out the reaction of the adsorbent with the flowing gas at the cloth filter, as completely as possible (by additive utilization). This means a rather long time interval between purification pulses at the cloth filter. However, the coating of the non-reacting dust from the combustion chamber requires a shorter purification interval, with any adsorbent which is still capable of reaction being removed prematurely from the reaction surface in the filter cake of the cloth filter.

Accordingly, if in an existing installation, a filter is available, such as an E-filter (which has been used, but which is still more or less, at least partially useable), this E-filter can be utilized and the cloth filter downstream can be maintained on a smaller scale. Thus, the entire installation would be much less costly to operate.

Thus, if the exhaust gases are purified as completely as possible before the distribution 6 of the adsorbents, it is possible to set up downstream of the combustion installation, a fertilizer factory or a bituminous coal plant or a plate manufacturing installation, which refines the thus-produced and loaded adsorbents, and thus takes advantage of an environmental protection installation, or which at least reduces the amounts deposited in the atmosphere, or outside the installations.

Within the scope of the present invention, it is possible to also release an adsorbent in the combustion chamber of the combustion installation itself, or into the exhaust gas current at an exhaust gas temperature of approximately 100° C. (i.e. shortly after the combustion stage), such adsorbent binding $SO_2$ and thus creating better conditions for the $SO_2/NO_x$ precipitation, which takes place downstream. Thus, the quantitative ratio of $SO_2/NO_x$ can be influenced so that a stoichiometric ratio at or near an optimum of 2:1 is attained. Alternatively, it is thus possible to reduce $SO_2$ partial pressure altogether, in order to reduce the cost of the correspondingly-expensive adsorbents added at the low-temperature point 6.

The process and apparatus of the present invention thus permits conversion of older installations, whereby the flue gases released into the atmosphere are now in compliance with environment protection regulations for new installations. Use of the present invention in new installations is also advantageous, since loaded adsorbents are obtained in a state of great purity, and are thus suitable as base substances for factories of building material and/or fertilizers.

The preceding description of the present invention is merely examplary, and is not intended to limit the scope thereof in any way.

What is claimed is:

1. Method of separating at least one harmful substance selected from the group consisting of $SO_2$, HCl and $NO_x$, wherein x is 1 or 2, from combustion exhaust gas containing the same, which comprises contacting said exhaust gas at a temperature below 400° C. with at least one substantially dry particulate adsorbent including $NaHCO_3$ which, at said temperature, releases carbon dioxide and forms an activated adsorbent, which released substance reacts with the harmful substance, said substantially dry particulate adsorbent being present in an amount such that the release substance and the activated adsorbent therefrom are sufficient to remove the harmful substance from said exhaust gas, whereby the amount of harmful substance in said exhaust gas is reduced, additionally comprising removing a portion of the exhaust gas containing the carbon dioxide after contact with said adsorbent, and introducing aqueous ammonia solution into the removed portion of the exhaust gas, to produce an $NH_4$-containing adsorbent.

2. The method of claim 1, additionally comprising removing at least a portion of particulates formed in a combustion chamber upstream from the flowing exhaust gas prior to the contacting thereof by said adsorbent.

3. The method of claim 1, wherein nitric oxide in said exhaust gas is removed or transformed to nitrogen.

4. The method of claim 1, additionally comprising mixing the adsorbent with a halide or alkaline compound as additive prior to contact with the exhaust gas.

5. The method of claim 4, wherein the halide is HCl.

6. The method of claim 4, wherein the adsorbent is mixed with from 0.5-50% of the additive prior to contact with the exhaust gas.

7. The method of claim 6, wherein the adsorbent is mixed with from 2-10% of the additive, prior to contact with the exhaust gas.

8. The method of claim 4, wherein the additive is NaCl, $NH_4Cl$, $(NH_4)_2CO_3$, or $Ca(OH)_2$.

9. The method of claim 1, wherein the adsorbent has a decomposition or sublimation temperature less than 400° C.

10. The method of claim 1, additionally comprising adding NaCl to the aqueous ammonia solution whereby a soda-containing adsorbent is prepared.

11. The method of claim 1, additionally comprising passing the exhaust gas through an electric filter before contact with the adsorbent.

12. The method of claim 1, additionally comprising grinding the adsorbent before contacting with the exhaust gas.

13. The method of claim 1, wherein the adsorbent additionally contains $CaCl_2$ when contacting the exhaust gas.

14. The method of claim 1, wherein the substantially dry, particulate adsorbent undergoes a change in crystal structure thereof in status nascendi within the exhaust gas at said temperature, whereby $SO_2$ becomes bound through formation of sulfite and sulfate, and nitrous oxides are also bound or transformed into nitrogen.

15. The method of claim 1, wherein the substantially dry, particulate adsorbent releases the water in status nascendi within the exhaust gas at said temperature.

16. The method of claim 15, wherein the released water originates substantially on grains of the thus-activated adsorbent.

17. The method of claim 1, wherein $NO_x$ is reduced to $N_2$ which is prevented from changing back into $NO_x$ at said temperature.

18. The method of claim 1, wherein said substantially dry particulate adsorbent additionally includes $NH_4HCO_3$ which decomposes into ammonia, water, and carbon dioxide.

19. The method of claim 1, wherein said substantially dry particulate adsorbent additionally includes $Al_2O_3$.

20. The method of claim 1, wherein said substantially dry particulate adsorbent additionally includes $Al(OH)_3$ which decomposes into water and $AlOOH$.

21. The method of claim 1, wherein said substantially dry particulate adsorbent additionally includes bauxite.

22. The method of claim 1, wherein the $NaHCO_3$ is added in the form of baking soda or a mineral.

23. The method of claim 1, wherein the exhaust gas is contacted at a temperature above 60° C.

24. The method of claim 1, wherein said substantially dry particulate adsorbent additionally includes $Ca(OH)_2$ which decomposes into water and calcium oxide.

25. The method of claim 1, wherein said substantially dry particulate adsorbent additionally includes $CaCl_2$.

26. The method of claim 23, wherein the exhaust gas is contacted at a temperature above 100° C.

27. The method of claim 1, wherein
said $NaHCO_3$ decomposes into $H_2O$, $CO_2$, and an active form of $Na_2CO_3$ appearing in status nascendi and still possessing a lattice structure of the sodium bicarbonate.

28. The method of claim 27, wherein NO is transformed into $NO_2$ or $N_2$ by reaction with the active $Na_2CO_3$.

29. The method of claim 27, wherein the $SO_2$ is bound by reaction with the active $Na_2CO_3$ to form a sulfite or sulfate.

30. Method of separating at least one harmful substance selected from the group consisting of $SO_2$, HCl, and $NO_x$, wherein x is 1 or 2 from combustion exhaust gas containing the same, which comprises contacting said exhaust gas at a temperature below 400° C. with at least one substantially dry particulate adsorbent including $NaHCO_3$ which, at said temperature, releases carbon dioxide and forms an activated adsorbent,
which released substance reacts with the harmful substance,
said substantially dry particulate adsorbent being present in an amount such that the released substance and the activated adsorbent therefrom are sufficient to remove the harmful substance from said exhaust gas,
whereby the amount of harmful substance in said exhaust gas is reduced,
additionally comprising
removing a partial flow of exhaust gas containing the carbon dioxide after the same has been substantially removed of said harmful substance,
cooling said partial flow of exhaust gas,
dissolving the thus-cooled flow of exhaust gas in an $NH_3$-containing liquid to form ammonium crystals, thus forming a mixture thereof,
centrifuging said mixture of said crystals and liquid to separate the same,
drying said thus-formed crystals,
directing the thus-separating liquid into an $NH_3$ saturator, whereby said liquid is enriched with $NH_3$, and
directing the thus-enriched liquid into contact with the partial flow of exhaust gas,
whereby hartshorn salt adsorbent for separating said harmful substance is synthesized.

* * * * *